United States Patent

De Vries

[15] 3,678,364

[45] July 18, 1972

[54] SURFACE WAVE DEVICES

[72] Inventor: Adrian J. De Vries, Elmhurst, Ill.

[73] Assignee: Zenith Radio Corporation, Chicago, Ill.

[22] Filed: May 18, 1971

[21] Appl. No.: 144,501

Related U.S. Application Data

[60] Division of Ser. No. 721,038, April 12, 1968, Continuation-in-part of Ser. No. 582,387, Sept. 27, 1966, abandoned.

[52] U.S. Cl. .................................. 329/117, 330/30, 330/72

[51] Int. Cl. ..................... H03h 9/32, H03d 3/00, H03d 3/16

[58] Field of Search ................ 333/30, 72; 310/8.2; 178/5.4; 330/5.5; 329/117

[56] References Cited

UNITED STATES PATENTS

| | | | |
|---|---|---|---|
| 3,401,360 | 9/1968 | Schulz-Du Bois | 333/30 |
| 3,360,749 | 12/1967 | Sittig | 333/30 |
| 3,289,114 | 11/1966 | Rowen | 333/30 |
| 3,568,102 | 7/1967 | Tseng | 333/30 |
| 3,582,838 | 6/1971 | De Vries | 333/72 |

*Primary Examiner*—Herman Karl Saalbach
*Assistant Examiner*—C. Baraff
*Attorney*—Francis W. Crotty and Cornelius J. O'Connor

[57] ABSTRACT

An acoustic filter for use in an FM receiver includes a body of piezoelectric material propagative of acoustic surface waves, a pair of surface wave interaction devices and a diode arranged as a discriminator.

3 Claims, 6 Drawing Figures

PATENTED JUL 18 1972 3,678,364

Inventor
Adrian J. DeVries
By Cornelius J. O'Connor
Attorney

SURFACE WAVE DEVICES

CROSS REFERENCE TO RELATED APPLICATION

The present application is a division of application Ser. No. 721,038, filed Apr. 12, 1968 and assigned to the same assignee as the present invention. Application Ser. No. 721,038, in turn, is a continuation-in-part of application Ser. No. 582,387, filed Sept. 27, 1966 but now abandoned.

BACKGROUND OF THE INVENTION

This invention pertains to solid state tuned circuitry. More specifically, it relates to an acousto-electric filter system in which particular types of surface wave transducers coupled to a body of piezoelectric material propagative of acoustic surface waves are utilized in a manner enabling signal selectivity, and in which the transducer configuration or arrangement allows the loss normally associated with such a transducer to be minimized. While the apparatus is theoretically operable at any desired response frequency, practical considerations indicate that extensive use may be made of the device in integrated circuitry applications such as, for example, in a discriminator for television receivers. The apparatus is, therefore, described in that environment.

Previous methods used to generate and detect surface elastic waves piezoelectrically involved the mechanical coupling of a compressional or shear wave transducer to the body on which the surface waves were to propagate. It is now known that a transducer composed of an electrode array, having interleaved combs of conducting stripes or "teeth" at alternating electric potentials, when coupled to a piezoelectric medium, produces acoustic surface waves on the medium which, in the simplified case of a ceramic poled perpendicularly to the surface, travel at right angles to the stripes. This wave is converted back to an electrical signal by a similar array of conducting stripes coupled to the piezoelectric medium near its output end. In principle, the strip pattern may be thought of as an antenna array. Consequently, similar selectivity should be possible, thereby eliminating the need for the critical or much larger and more cumbersome components normally associated with selective circuitry.

Accordingly, it is a primary object of the present invention to utilize a comb-type electrode array to provide a frequency selective circuit sufficiently small for use in integrated circuitry applications.

It is a specific object of the invention to provide a comb-type electrode array for use as an FM discriminator.

In accordance with the invention, an acoustic filter system comprises a body of piezoelectric material propagative of acoustic surface waves, a series of frequency modulated signals of predetermined carrier frequency and a pair of surface wave interaction devices coupled to spaced surface portions of the body and individually having a maximum interaction with the body at a frequency corresponding to the carrier. The signal source is coupled across one of the devices while means, including a diode and a load, serve to couple the interaction devices in a series circuit.

DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in conjunction with the accompanying drawings, in the several figures of which like reference numerals identify like elements and in which:

In FIG. 1, a signal source 10 in series with a resistor 11, which may represent the internal impedance of that source, is connected in parallel with an inductor 12 across an input transducer or surface wave interaction device 13 mechanically coupled to one major surface of a body of piezoelectric material shown as a substrate 14. An output or second portion of the same surface of substrate 14 is, in turn, mechanically coupled to an output transducer 15 which is coupled across a load 18 in parallel with an inductor 16. The resistor 17 may or may not by included as the requirements of the installation dictate.

Figure 1:
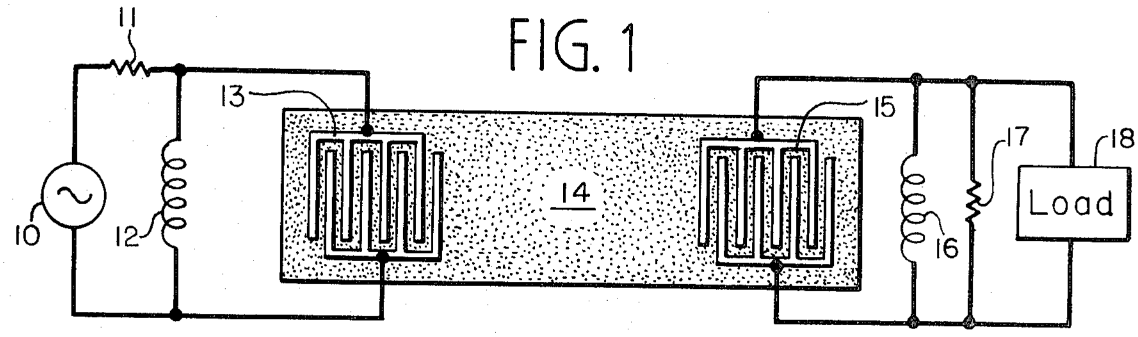
FIG. 1 is a partly schematic plan view of one embodiment of an acoustic filter system.

Transducers 13 and 15, in the simplest arrangement, are identical and are constructed of two comb-type electrode arrays. The stripes or conductive elements of one comb are interleaved with the stripes of the other. The electrodes are of a material such as gold which may be vacuum deposited on the plane surface of a highly lapped and polished piezoelectric substrate 14 of a material that is propagative of acoustic surface waves, such as PZT or quartz. The distance between the centers of two consecutive stripes in each array is one-half of the acoustic wavelength of the signal wave for which it is desired to achieve maximum response.

For the purpose of facilitating an understanding of this device and, in particular, of its differences from previous devices, operation in a typical and simple embodiment will be explained initially. Specifically, direct piezoelectric surface wave transduction is accomplished by the spatially periodic interdigital electrodes of transducer 13. Considering this device as a transmitter, a periodic electric field is produced when a signal from source 10 is fed to the electrodes and through piezoelectric coupling the electrical signal is transduced to a traveling acoustic surface wave on substrate 14. This occurs when the strain components produced by the electric fields in the piezoelectric substrate are substantially matched to the strain components associated with the surface wave mode. Source 10, for example a television receiver or an FM radio receiver, produces a range of signal frequencies, but due to the selective nature of the arrangement only a particular frequency and its intelligence-carrying side bands are converted to a surface wave. More specifically, source 10 may be the tunable front end of a television receiver which selects a desired program signal for application to load 18 which, in this environment, comprises those stages of a television receiver subsequent to the IF selector which respond to the program signal in producing a television image and its associated audio program. The surface wave resulting in substrate 14 in response to the energization of transducer 13 by the If output signal from source 10 is translated along the substrate to output transducer 15 where it is converted to an electrical output signal for application to load 18.

In a typical television IF embodiment, utilizing quartz as the piezoelectric substrate 14, the stripes of both transducer 13 and transducer 15 are approximately 0.7 mils wide and are separated by 0.7 mils for the usual IF application, that is to say, for the application of an IF signal in the range of 40–46 MHz. The spacing between transducer 13 and transducer 15 is on the order of 0.3 inch and the width of the wave front is approximately 0.4 inch. This structure of transducers 13, 15 and substrate 14 acts as a double-tuned circuit with a resonant frequency of approximately 40 MHz., the resonant frequency being determined by the spacing of the stripes as described more particularly hereafter.

The potential developed between any given pair of successive stripes in the electrode array 13 produces two waves traveling along the surface of substrate 14, in opposing directions perpendicular to the stripes for the illustrative isotropic case. When the distance between the stripes is one-half of the acoustic wavelength of the wave at the desired input frequency, or an integral multiple thereof, relative maxima of the output wave are produced by piezoelectric transduction in interaction device 15. For increased selectivity, additional electrode stripes are added to the comb patterns of devices 13 and 15 as described in greater detail hereinafter.

Inductor coils 12 and 16 are for matching purposes and are added to tune with the clamped capacitance $c_o$, that is, the capacity associated with or exhibited by the electrode stripe arrays 13 and 15 when they are clamped for surface waves thereby making the input impedance real. In a manner to be described, inductance variations of coils 12 and 16 provide a convenient parameter for shaping the response of interaction devices 13 and 15 and, therefore, for determining a desired IF frequency characteristic for the receiver. It is useful to observe that the same coils could also be used to couple the desired signal to or from one or more different substrates carrying amplifiers, elements or functional devices. By varying the position and spacing of the coils on the separate substrates, the coupling coefficient is changed. In addition, the combs of the interaction devices may be so constructed as to eliminate the effect of clamped capacitance, obviating the need of coils 12, 16. Such a device is described in the copending application of Adrian DeVries and Fleming Dias, Ser. No. 710,118, filed Mar. 4, 1968, and assigned to the same assignee. The Q's of the loaded coupled circuits formed by the coils, however, should preferably be smaller than the effective Q of the acoustic filter circuit so that variations of clamped capacity do not affect the response more than can be tolerated.

Figure 1A:
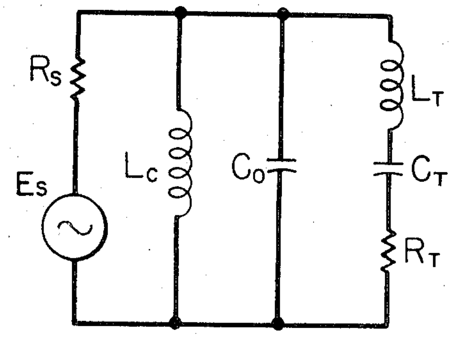
FIG. 1*a* is an electrical representation of one terminal portion of such a system including a signal source.

More particularly, and directing attention to the equivalent circuit of interaction devices 13, 15 shown in FIG. 1*a*, assume that $E_s$ is the signal source with $R_s$ as its internal impedance, $R_s$ can also represent the impedance of load 18 when $E_s$ is shorted; inductor $L_c$ is coil 12 and 16 for resonating with clamped capacitance $C_o$; and $L_T$, $C_T$, $R_T$ represent in terms of inductance, capacitance and a.c. resistance the electrical equivalent of the mechanical parameters of interaction device 13 or 15 as a surface wave transducer. Preferably, the Q of the circuit containing $R_s$ in conjunction with $L_c$,$C_o$ is small relative to the Q of circuit $L_T$, $C_T$, $R_T$ which is the electrical analogue of the combination represented by the interaction device 13 or 15 in coupled relation with substrate 14. It is apparent that an impedance transformation will be achieved simultaneously with the tuning out of clamped capacitance $C_o$ if resonating inductance $L_c$ is connected in series with $R_s$ and the input terminals of the transducer.

Figure 2:
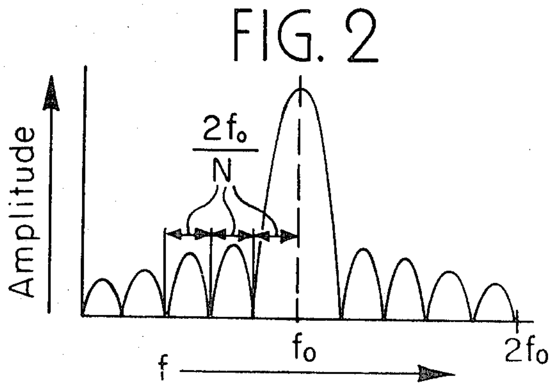
FIG. 2 is a plot of the amplitude of the received signal as a function of frequency, showing the selectivity of a single surface wave interaction device of the type used in the system of FIG. 1.

FIG. 2 depicts a selectivity curve with relative maximum and associated side lobes as expected for a transducer of the type utilized in the FIG. 1 apparatus, neglecting the effect of tuning inductance 12. A simplified analysis indicates that the selectivity of such a transducer with $N+1$ stripes may be compared with a coil having a Q of the order of $N$. The resonance curve is broader than the peak of a single tuned circuit and the the phase response is flat over a range. Some of the spurious responses can be reduced by selecting the number of stripes in the transmitting transducer to be different from the number of stripes in the receiving transducer. Other desired variations in the selectivity characteristics may be obtained if the length of a given stripe is altered with respect to other stripes.

The selectivity curve of FIG. 2 is of the sin $x/x$ variety and is symmetrical with respect to the frequency $f_o$ at which the interaction device has its maximum interaction with substrate 14. It has null points or minimum responses at frequencies which have a frequency separation of $2 f_o/N$ where $N$ is the number of elemental transducers included in each electrode array 13 and 15. That is to say, each conductive element of either of the interleaved combs in these arrays forms an elemental transducer with each contiguous neighbor and, therefore, the number $N$ of elemental transducers is one less than the number of conductive elements of either array. The selectivity pattern or frequency response of each interaction device is proportional to the following:

$$\frac{\sin N \frac{\Delta f}{f_0} \frac{\pi}{2}}{N \frac{\Delta f}{f_0} \frac{\pi}{2}} \qquad (1)$$

where $\Delta f$ is the deviation from the frequency of maximum response. It has a dominant response region plus symmetrical side lobes the attenuation of which is approximately proportional to the following:

$$20 \log [(2P+1)/2]\, \pi \qquad (2)$$

in decibels $P$ is an integer designating the order of the side lobe, first, second, etc. Equation (1) makes clear that the selectivity is subject to adjustment and, therefore, an acoustic filter system patterned after FIG. 1 is very attractive for use as the IF channel of a color television or monochrome receiver. The response defined in expression (1) is obtained if the conductive elements of the interleaved combs are of uniform dimensions. The response may be modified by using non-uniform dimensions. For example, the lengths of the conductive elements may decrease along the length of the combs converting the characteristic to an exponential or other function.

When inductor 12 is present, the shape of the principal lobe of the response characteristic, as well as the side lobes, is changed in a manner that depends upon the frequency at which this inductor tunes out the clamped capacitance of the transducer. Of course, the response is also influenced by the relative values of the parameters represented in FIG. 1*a*.

The discussion to this point has been confined to the response of a single transducer. The system response can be approximated by the summation of the individual responses of its pair of transducers. The characteristics of the substrate may have a second order effect on the system response.

In mounting the substrate with its interaction devices in place, it is necessary that the substrate be flat, that is, it should not be bent or the surface wave phenomenon may be disturbed. If the thickness of the substrate is large relative to the wavelength of the surface wave, there will be very little influence of the supporting structure on the performance of the acoustic filter system.

Figure 3:
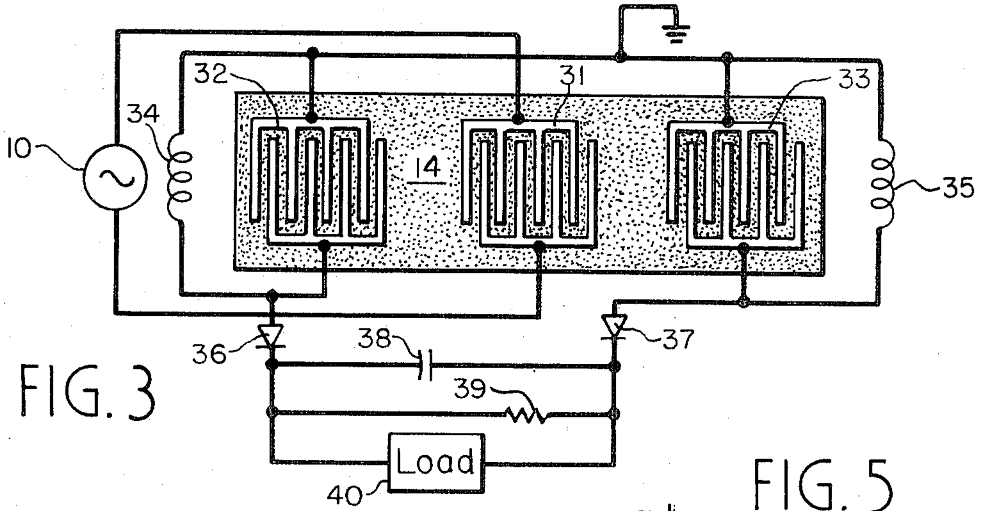
FIG. 3 is a partly schematic plan view of a discriminator circuit utilizing an acoustic filter system.

Tuned circuits or acoustic filter systems of the type proposed are of particular utility in FM discriminator circuitry as illustrated in FIG. 3. Source 10 is coupled across comb-type transducer 31 which is mechanically coupled to the center portion of piezoelectric substrate 14. Similarly coupled to the respective end portions of substrate 14 are comb-type output transducers 32 and 33. One side of each of transducers 32 and 33 is grounded. Inductors 34 and 35 are coupled across transducers 32 and 33, respectively, to tune out their clamped capacitance and also to form a DC return path. The ungrounded side of inductor 34 is connected to one end of a diode 36, while the ungrounded side of inductor 35 is connected to the corresponding end of a diode 37. Load 40, in parallel with capacitor 38 and resistor 39, is connected across the other ends of diodes 36 and 37.

In operation, source 10 produces a signal across input transducer 31 which, as described previously, transmits as surface waves those signals to which it is tuned. Transducers 32 and 33, so designed that their resonating frequencies are respectively a certain amount $\Delta f$ below and above the resonating frequency of transducer 31, act as receivers of the respectively selected acoustic signal waves and convert them to electrical signals. The output signal response as seen by load 40 has the familiar FM discriminator characteristic; the separation $2\Delta f$ between the response peaks of transducers 32 and 33 is related to the Q and the desired linearity of the discriminator in the usual manner. The circuit formed by transducer 31 and source 10 has in general a lower Q than the circuit comprising transducers 32 and 33. It may be noted that the loss normally associated with bidirectional transducer 31 is eliminated due to the fact that transducers 32 and 33 are symmetrically positioned on either side of transducer 31 in the path of surface wave propagation. In a practical receiver application source 10 delivers a frequency modulated IF signal to input device 31 and detected program information, usually audio, is delivered to load 40 where it may be further amplified prior to utilization.

Figure 4:
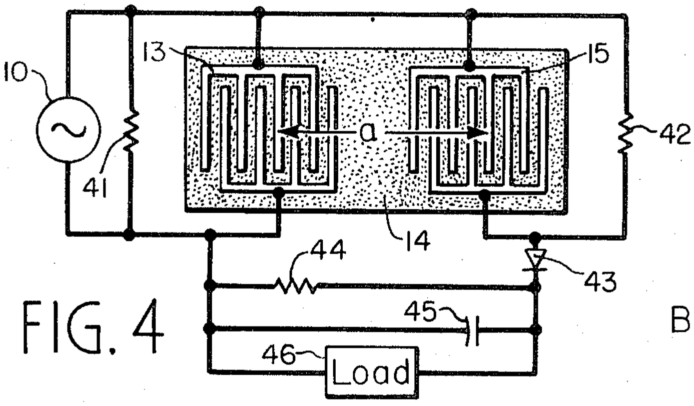
FIG. 4 is a partly schematic plan view of another embodiment of a discriminator circuit.

Another discriminator circuit is depicted in FIG. 4. Source 10 is coupled across a resistor 41 which is in turn coupled across input transducer 13 of a device like that in FIG. 1. Hence, transducer 13 is mechanically coupled to piezoelectric substrate 14. Comb transducer 15 is similarly coupled to substrate 14, at a distance "*a*" from transducer 13, where "*a*" is their center to center spacing. Across transducer 15 is coupled a resistor 42. One side of transducer 13 is connected to the corresponding side of transducer 15. The other side of transducer 15 is connected to one end of a diode 43. Resistor 44, capacitor 45 and a load 46 are connected in parallel and coupled across the other end of diode 43 and the other side of transducer 13 forming a peak detector circuit with a time constant, determined by resistor 44 and capacitor 45, taking into account load 46, which is low compared to the highest FM modulating frequency.

In operation, signal source 10 induces across transmitting transducer 13 a broad-band signal comprising the sinusoidal signal of frequency $\omega$ and of the form:

$$A \cos \omega t,$$

where $A$ is a constant. Transducer 13 is selective and emits two traveling surface waves corresponding to the electrical signal $A \cos \omega t$ one of which is received directly by transducer 15. The electrical signal produced across the terminals of transducer 15, connected in series with transducer 13, in response to this surface wave is expressed:

$B \cos [\omega t - (a\omega/V_r)]$ where $V_r$ is the surface wave velocity and B is a constant having a value much much less than $A$.

Figure 5:
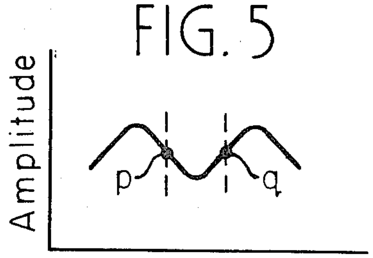
FIG. 5 is a plot of the detected signal from the apparatus of FIG. 4 as a function of frequency.

The output on load 46 is the detected sum of the signals:

$$A \cos \omega t + B \cos [\omega t - (a\omega/V_r)]$$

and is depicted in FIG. 5 as a function of frequency. Either point $p$ or $q$ in the curve of FIG. 5 may be selected as the operating point of a discriminator and each interactive device 13, 15 is constructed to have maximum interaction at the chosen operating point. The difference between the maxima as a function of $\omega$, which defines the sensitivity, can be varied by changing the spacing "*a*." Resistors 41 and 42 provide a DC return path, but they may be replaced by inductors, printed or conventional, which are used as part of an impedance matching network of the type previously described with relation to the apparatus of FIG. 1.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. An acoustic filter system comprising:

a body of piezoelectric material propagative of acoustic surface waves;

at least three surface wave interaction devices actively coupled to assigned surface portions of said body and separated from one another in the direction of surface wave propagation and individually having maximum interactions with said body at assigned predetermined frequencies;

a source of frequency modulated signals of a predetermined carrier frequency;

means for coupling said source to one of said devices to launch acoustic surface waves on said body, said one device having a maximum interaction with said body at said carrier frequency;

and means coupled to the remaining two devices for deriving energy from the launched acoustic surface waves for application to a load, said remaining two devices having maximum interactions with said body at frequencies higher and lower, respectively, than said carrier frequency.

2. An acoustic filter system in accordance with claim 1 in which said two remaining devices are coupled in a series circuit which also includes two reversely poled diodes and said load, with said load disposed between said diodes.

3. An acoustic filter system comprising:

a body of piezoelectric material propagative of acoustic surface waves;

a source of frequency modulated signals of predetermined carrier frequency;

a pair of surface wave interaction devices coupled to spaced surface portions of said body and individually having a maximum interaction with said body at a frequency corresponding to said carrier frequency;

means coupling said source across one of said devices;

and means including a diode and a load for coupling said interaction devices in a series circuit.

* * * * *